Figure 1:
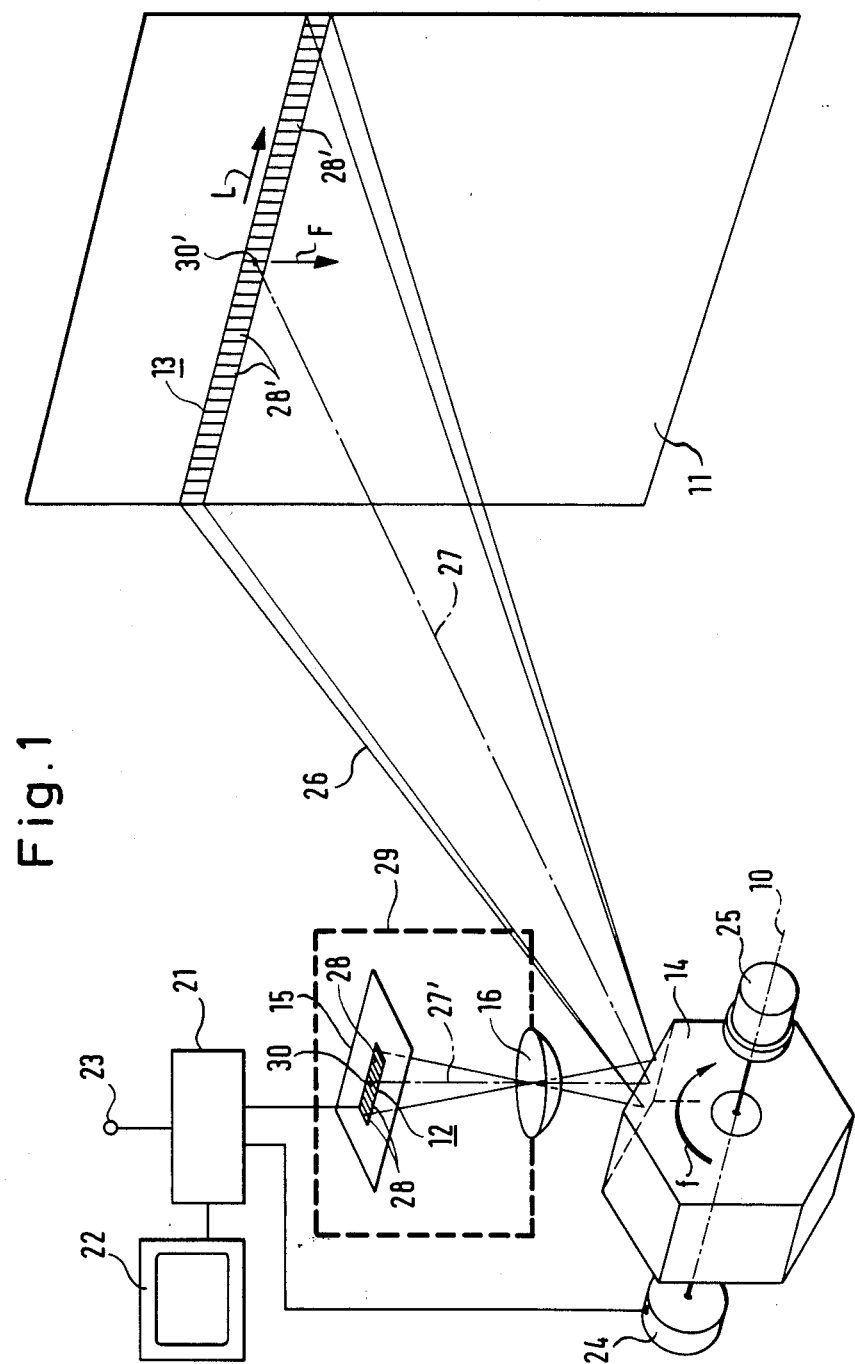

United States Patent [19]

Fetzer et al.

[11] Patent Number: 4,851,913
[45] Date of Patent: Jul. 25, 1989

[54] PICTURE RECORDING APPARATUS

[75] Inventors: Günter Fetzer, Gundelfingen; Heinrich Hippenmeyer, Freiamt, both of Fed. Rep. of Germany

[73] Assignee: Erwin Sick GmbH Optik Elektronik, Waldkirch, Fed. Rep. of Germany

[21] Appl. No.: 127,855

[22] Filed: Dec. 2, 1987

[30] Foreign Application Priority Data

Dec. 3, 1986 [DE] Fed. Rep. of Germany ....... 3641258

[51] Int. Cl.[4] .................... H04N 1/028; H04N 3/15
[52] U.S. Cl. ................................ 358/206; 358/101; 358/494
[58] Field of Search ............... 358/206, 293, 294, 106, 358/107, 101

[56] References Cited

U.S. PATENT DOCUMENTS

| | | | |
|---|---|---|---|
| 4,229,769 | 10/1980 | Pitts | 358/294 |
| 4,258,395 | 3/1981 | Nodov | 358/294 |
| 4,576,482 | 3/1986 | Pryor | 358/107 |
| 4,712,142 | 12/1987 | Tomita | 358/293 |
| 4,750,035 | 6/1988 | Chang | 358/101 |

Primary Examiner—Howard W. Britton
Attorney, Agent, or Firm—Townsend and Townsend

[57] ABSTRACT

A picture recording apparatus comprises a light source (16) which illuminates the object to be recorded, a light sensitive semiconductor row (12), and an objective (16) which images a strip-like section (13) of the object onto the semiconductor row (12). A relative movement takes place between the semiconductor row (12) and the image of the strip-like section (13) located thereon in a direction perpendicular to the longitudinal extent of the row and in the image plane. For this purpose a light deflecting device (14), which continuously displaces the image of the strip-like section (13) in a direction perpendicular to the longitudinal extent of the semiconductor row (12) and in the image plane (15), is arranged between the object (11) and the semiconductor row (12).

11 Claims, 3 Drawing Sheets

PICTURE RECORDING APPARATUS

The invention relates to a picture recording apparatus comprising a light source which illuminates the object to be recorded, a light sensitive semiconductor row and an objective which forms an image of a strip-like section of the object on the semiconductor row, wherein a relative movement takes place between the semiconductor row and the image of the strip-like section located thereon, in a direction perpendicular to the longitudinal extent of the row and in the image plane, in such a way that larger regions of the object or the whole object is detected by the semiconductor row in sequential time steps.

Such picture recording apparatuses serve to illuminate a two-dimensional picture information and to record it with the aid of a semiconductor row camera.

Surface cameras are already known for recording two-dimensional picture information, with the tube cameras which were previously customary being increasingly replaced by semiconductor cameras.

As such surface cameras have however a restricted resolution and processing speed one has already used row cameras with semiconductor rows for picture recording apparatus, with the second dimension of the picture information perpendicular to the extent of the row being obtained by relative movement of the object and camera and also by the linewise picture build-up. The row camera has a significantly higher resolution and speed of processing per row when compared with the semiconductor surface camera, however only in one dimension. The higher resolution of the row camera can however frequently not be exploited in conjunction with the required relative movement of the object and the camera, because the required precision of the uniform movement or synchronization between the transport and row recording is disadvantageously affected by slip and vibration.

The object of the present invention is to provide a picture recording apparatus of the initially named kind in which the high resolution and processing speed of a semiconductor row camera can be fully exploited without precision problems occurring during relative displacement between the image of the object and the semiconductor row.

In order to satisfy this object the invention provides that a light deflecting device which continuously displaces the image of the strip-like section in a direction perpendicular to the longitudinal extent of the semiconductor row and in the image plane is arranged between the object and the objective.

In accordance with the invention the object and the semiconductor row can therefore be of fixed position relative to one another in the direction of the longitudinal extent of the semiconductor row and in the image plane. Thus, in accordance with the invention, a relative displacement between the object and the camera is advantageously totally avoided. Accordingly, the problems which previously arose with slip and vibration, and also the cost and complexity which was necessary to achieve a relative displacement which was as precise, as possible are avoided.

The light deflecting apparatus, which is preferably formed by a mirror wheel or by a rotary or oscillating mirror, pivots or sweeps the light beam which generates the image with an increasing angle of deflection in such a way that all the regions of the image of the strip-like section which are to be detected by the semiconductor row impinge on the latter in time sequence and remain there until the relevant region has been fully electronically detected by the electronic scanning of the semiconductor row.

Using the light deflecting apparatus of the invention the projection of the image of the semiconductor row in the object plane is thus preferably continuously displaced perpendicular to its longitudinal extent. Through the preferably continuous displacement of the image of the strip-like section of the object formed on the semiconductor row the resolution in the direction of displacement is primarily dependent on the projected speed of displacement and the electronically produced read-out cycle of the semiconductor row. Decisive for the resolution in this direction is also the height of the diode row, and indeed, stated more precisely, the projected height of the diode row in the object plane.

The light deflecting apparatus arranged between the object and the objective is preferably located close to the objective.

In this respect it should be noted that the distance from the objective to the mirror wheel should be as small as possible, and is only restricted in that the objective does not mechanically cover over the full beam cross-section between the object plane and the mirror wheel. The reason why this distance should be very short is as follows:

When the mirror wheel is located in the central position the focus of the light transmitting or receiving optical system is precisely located at the center of the objective. On rotation of the mirror wheel this point moves on the objective by an amount which is dependent on the angle of rotation and the distance of the mirror wheel from the objective. Since one can make objectives with a small aperture better and more fault free, the aim here is also to use an objective with a small aperture. A precondition for this is however that the light bead at the location of the objective does not move too much so that it can still be received by the objective. This is achieved when the distance from the surface of the mirror wheel to the objective is a minimum. In addition to this comes the fact that the light bead on the objective is not a precise point but has instead a finite extent which is brought about solely by the finite extent of the light source and the finite error of the optical transmitting and receiving system.

In order to be able to detect an object with a row camera at all it is necessary that this object presents a contrast which can be evaluated at the appropriate wavelength. This contrast can be produced by illumination both in reflection and also in transmission. With reflected illumination considerably higher light intensity is generally necessary at the object as a result of the diffuse remission of the object. Illumination in transmission (light source located behind the object) has substantial advantages particularly when only the contour of the object, i.e. its shadow image, is to be evaluated.

It is particularly advantageous for the object to be arranged in a telecentric beam path which is concentrated into the objective. With this arrangement the object should in particular be arranged between an optical transmitting system and an optical receiving system, with the focal point of the optical transmitting system being located in or close to the light source or an image thereof, and with the focal point of the optical receiving system being arranged in or close to the objective.

The advantageous combination of telecentric illumination and optical receiving systems, which is particularly advantageous with illumination in transmission, leads to the space in which the object is located being permeated by parallel radiation. This has the considerable advantage that a system is provided which has only a low dependence on distance and a large depth of field, as a result of the combination of the telecentric illumination with an optical receiving system which concentrates the light in the objective.

As the optical transmitting and receiving systems of a telecentric beam path must have, area-wise, at least the extent of the object to be recorded it is expedient for the optical and/or receiving systems to consist of Fresnel lenses and/or concave mirrors.

For the electronic processing of the optical information received from the semiconductor row provision is expediently made for the semiconductor row and for an angle sensor, which delivers an electrical signal representative of the instantaneous light deflection angle of the light deflecting device, to be connected to an electronic evaluation and interrogation circuit which evaluates the received picture information.

Figure 2:
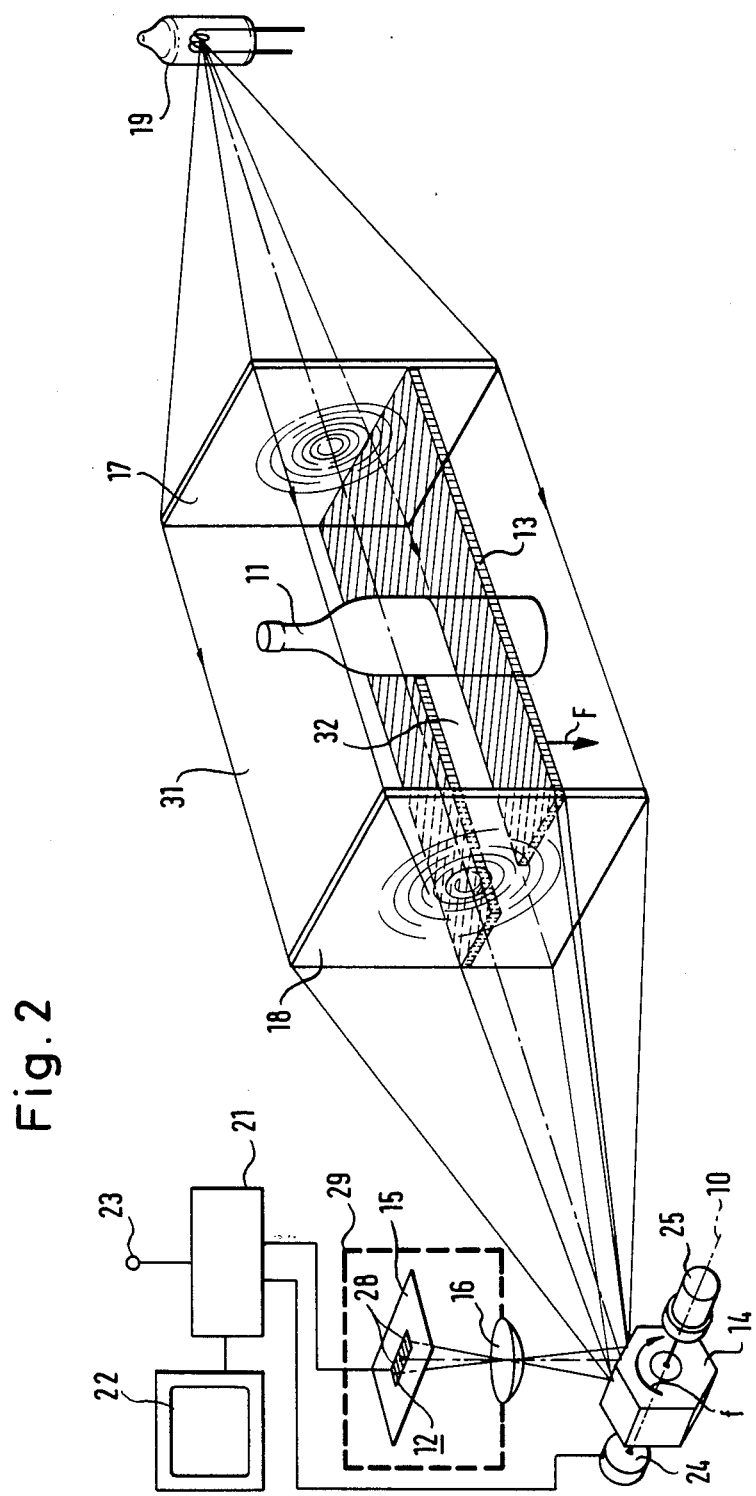
Figure 3:
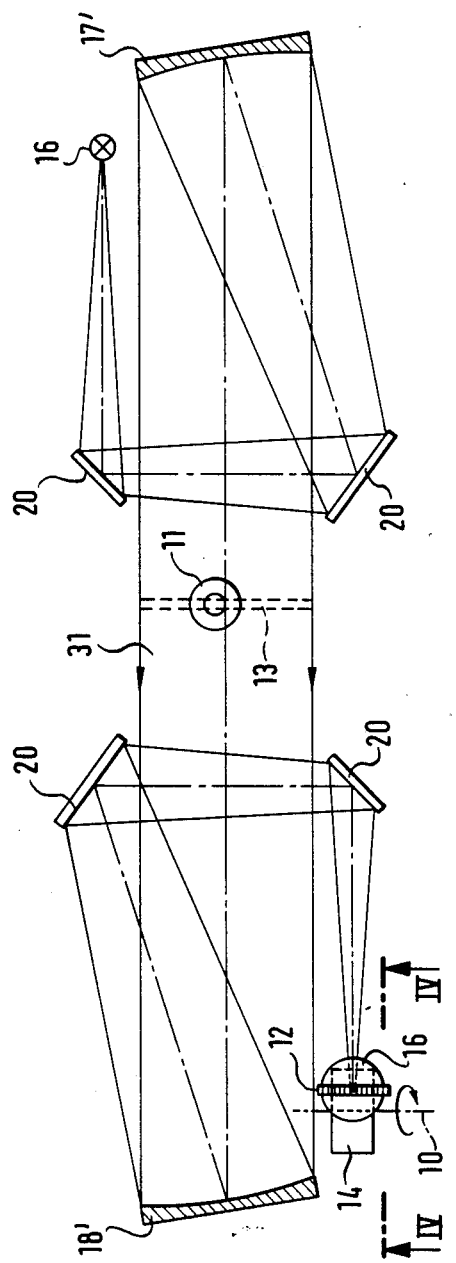
Figure 4:
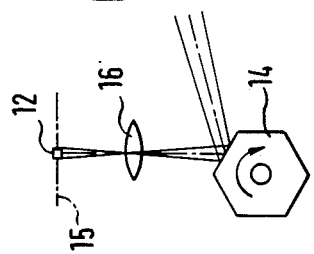

The invention will now be described in the following by way of example and with reference to the drawing in which are shown:

FIG. 1 a schematic perspective illustration of the basic principle of a picture recording apparatus in accordance with the invention shown in block circuit form, FIG. 2 a schematic respective block circuit illustration of an embodiment of the picture recording apparatus of the invention which operates with a telecentric beam path, FIG. 3 a plan view of an embodiment of a picture recording apparatus in accordance with the invention which operates with a telecentric beam path and concave mirrors, and FIG. 4 a schematic section on the line IV—IV of FIG. 3.

As seen in FIG. 1 a strip-like section 13 of a flat object 11 arranged in a plane is imaged, via a mirror surface of a mirror wheel 14 and an objective 16 arranged at an angle to the incident light beam 26 onto a semiconductor row 12. The semiconductor row 12 is located in an image plane 15 which extends perpendicular to the optical axis 27' of the objective 16. The axis of rotation 10 of the mirror wheel 14 is perpendicular to the plane of reflection which is defined by the optical axis 27' and the central ray 27 from the strip-like section 13.

The mirror wheel 14 is driven to execute a continuous rotary movement in the direction of the arrow f by a drive motor 25. An angle sensor 24 is arranged on the axle of rotation and is connected, in the same manner as the semiconductor row 12, to an electronic evaluation and interrogation circuit 21. The electronic evaluation and interrogation circuit 21 feeds a screen monitor 22 and a selection signal terminal 23.

The semiconductor row 12 consists of a row of light sensitive individual elements 28 arranged directly alongside one another. The strip-like section 13 on the object 11 corresponds with the image which the objective 16 projects from the diode row 12 into the plane of the object 11. The images o the individual light sensitive elements 28 are indicated in FIG. 1 by 28'.

The objective 16 and the diode row 12 are combined into a semiconductor row camera 29 as indicated in FIG. 1 by a broken line.

The optical axis 27' of the diode row camera 29 impinges on the center 30 of the image plane 15 and also passes through the center of the semiconductor row 12 which is fixedly arranged in the image plane 15.

The image of the semiconductor row 12 developed in the plane of the object 11 by the objective 16 corresponds, as mentioned, with the strip-like section 13 of the object 11 which is being imaged at the particular instant onto the semiconductor row 12 via the mirror wheel 14 and the objective 16.

As a result of the rotation of the mirror wheel 14 in the direction of the arrow f the strip-like section 13 of the object which coincides at any particular instant with the image of the semiconductor row 12 is displaced in the direction of the arrow F in FIG. 1. In other words the image of the diode row 12 developed by the objective 16 via the mirror wheel 14 in the plane of the object 11 migrates in the direction of the arrow F to the lower edge of the object 11 whereupon the next mirror surface of the mirror wheel 14 takes over the deflection of light beam and the scanning process starts anew at the upper edge of the object 11. In fully corresponding manner the optical axis 27 which passes through the center 30' of the strip-like section 13 which is reflected at the mirror surface of the mirror wheel 14 also executes a scanning movement.

As the semiconductor row 12 is located in the darkened interior of the diode camera 29 a true image is not present in the region of the strip-like section 13, the semiconductor 12 however sees at any particular instant that strip-like section 13 of the object 11 which is projected onto it by the mirror wheel 14 and the objective 16.

Thus although both the object 11 and the semiconductor or diode row 12 and the semiconductor row camera 29 are stationary, the semiconductor row 12 not only continuously and sequentially scans the strip-like section 13 stepwise in their longitudinal direction L but also detects in stepwise manner in sequential time steps the strip-like sections which follow one another in the direction of the arrow F perpendicular to their longitudinal extent L in accordance with the speed of rotation of the mirror wheel 14.

Consequently, full information on all picture points of the object 11 are available in the electronic processing and interrogation circuit 21, and can for example be composed into a full picture of the object 11 and can be made visible on a screen monitor 22. However, the individual picture point signals are preferably evaluated in accordance with some form of criteria, for example error criteria, and a signal appears at the selection signal terminal 23 which decides whether the object 11 is faulty or not.

As seen in FIG. 2 a light source 19 formed as a light bulb is arranged at the focal point of an optical transmitting system 17 constructed as a Fresnel lens from which a parallel light beam 31 emerges. An optical receiving system 18 is arranged at a substantial distance from the optical transmitting system 17 parallel thereto and has the same area. In the embodiment of FIG. 2 this optical receiving system is likewise formed by a Fresnel lens. The mirror wheel 14, the objective 16, the diode row 12 and the image plane 15 are arranged analogously to the embodiment of FIG. 1, with the focal point of the optical receiving system 18 being optically located in the objective 16. In this manner the entire light of the parallel light beam 31 is directed into the interior of the diode row camera 29. The object 11 which is to be recorded by the picture recording apparatus of FIG. 2 is a bottle in the present case and is arranged between the optical transmitting system 17 and the optical receiving system 18. At any instant, only a strip-like section 13 is imaged onto the diode row 12, in like manner to the embodiment of FIG. 1, with this strip-like section 13 again executing a repeated scanning movement over the entire height of the parallel light beam 31 in the direction of the arrow F. An interruption 32 of the strip-like section 13 is indicated behind the bottle representing the object 11, and is intended to indicate that in this region the light is interrupted or attenuated by the bottle 11 which has been inserted, which can be recognized by the electronic processing and interrogation circuit 21 and converted into a signal for the thickness and/or the shape of the bottle.

As a result of the telecentric beam path of FIG. 2 the strip-like section 13 not only extends in the transverse direction but also in the longitudinal direction between the optical systems 17, 18 which indicates that the depth of field of the embodiment of FIG. 2 is very large. Moreover, the sensitivity of the embodiment of FIG. 2 relative to different distances of the object 11 from the semiconductor row camera 29 is considerably reduced.

In the same way that the same reference numerals are used in FIG. 2 to designate parts which correspond to parts of FIG. 1, the same reference numerals are also intended in FIGS. 3 and 4 to designate parts which correspond to parts of FIG. 1.

In FIGS. 3 and 4 the electrical and electronic parts for the drive of the mirror wheel 14 and for the evaluation are however not illustrated. These parts are formed in accordance with FIGS. 1 and 2.

In the embodiment of FIG. 3 the optical transmitting and receiving systems 17' and 18' are respectively formed as concave mirrors for which purpose the light from the light source 16 is directed obliquely by one or more plane deflecting mirrors 20 from the front side onto the concave transmitting mirror 17'. The concave receiving mirror 18' transmits a light beam at an angle to the parallel light beam 31, via two further plane deflecting mirrors 20, to the mirror wheel 14 from where the optical beam path basically extends precisely as in the embodiment of FIG. 2.

Regions which are very extended area-wise can be uniformly illuminated both by the concave mirrors 17', 18' and also by the Fresnel lenses 17, 18 of FIG. 2, in a manner which is required for the area-wise picture scanning of larger articles such as bottles etc.

Any remaining residual lack of sharpness can be kept small by reducing the aperture ratio of the objective. As a result of the described telecentric beam path of FIGS. 2 to 4 the light yield from the illumination beam path is however now considerably higher than with diffuse illumination in reflection, so that the aperture ratio of the objective 16 can be kept very small which signifies that a large depth of field can be achieved.

We claim:

1. A picture recording apparatus, comprising:
   an optical transmitting system having a focal point;
   a light source, disposed close to the focal point of the optical transmitting system, for illuminating an object to be recorded;
   an optical receiving system having a focal point, disposed such that the object to be recorded is situated between the optical transmitting system and the optical receiving system;
   a light sensitive semiconductor row having a longitudinal extent and defining an image plane;
   an objective, disposed close to the focal point of the optical receiving system, for forming an image of a strip-like section of the object on the semiconductor row;
   the object being arranged in a telecentric beam path which is concentrated into the objective; and
   a light deflecting device, disposed between the object and the objective;
   the light deflective device continuously displacing an image of the strip-like section in a direction perpendicular to the longitudinal extent of the semiconductor row and in the image plane;
   wherein a relative movement takes place between the semiconductor row and the image of the strip-like section located thereon in a direction perpendicular to the longitudinal extent of the semiconductor row and in the image plane such that regions of the object are detected by the semiconductor row in sequential time steps.

2. The apparatus of claim 1, wherein the light deflecting device is a mirror wheel.

3. The apparatus of claim 1, wherein the light deflecting device is located close to the objective.

4. The apparatus of claim 1, wherein the optical transmitting system includes a Fresnel lens.

5. The apparatus of claim 1, wherein the optical receiving system includes a Fresnel lens.

6. The apparatus of claim 1, wherein the optical transmitting system includes a concave mirror.

7. The apparatus of claim 1, wherein the optical receiving system includes a concave mirror.

8. The apparatus of claim 1, further including:
   an angle sensor, coupled to an axis of rotation of the light deflecting device, for providing a signal representative of an instantaneous light deflection angle of the light deflecting device; and
   an electronic processing and interrogation circuit, for receiving the signal from the angle sensor and evaluating picture information received from the light sensitive semiconductor row.

9. The apparatus of claim 1, further including:
   a control pulse generator, for driving a stepping motor that drives the light deflecting apparatus;
   output pulses from the control pulse generator being formed by further processing of line readout pulses so as to force synchronization between a line scanning frequency and an image scanning frequency.

10. The apparatus of clam 1, wherein the object at least partially attenuates a light beam.

11. The apparatus of claim 1, wherein the object at least partially interrupts a light beam.

* * * * *